(12) United States Patent
Voigt et al.

(10) Patent No.: US 10,562,817 B2
(45) Date of Patent: Feb. 18, 2020

(54) GYPSUM FIBER BOARD AND METHOD FOR PRODUCING GYPSUM FIBER BOARDS

(71) Applicant: Knauf Gips KG, Iphofen (DE)

(72) Inventors: Wolfgang Voigt, Burgbernheim (DE); Lothar Scheller, Iphofen (DE); Jurgen Burczeck, Segnitz (DE); Vladimir Tsvetanov, Vidin (BG); Vanya Ivanova-Tsaneva, Vidin (BG)

(73) Assignee: Knauf Gips KG, Iphofen (DE)

( * ) Notice: Subject to any disclaimer, the term of this patent is extended or adjusted under 35 U.S.C. 154(b) by 169 days.

(21) Appl. No.: 15/628,596

(22) Filed: Jun. 20, 2017

(65) Prior Publication Data
US 2017/0362126 A1  Dec. 21, 2017

Related U.S. Application Data

(63) Continuation of application No. PCT/EP2014/003457, filed on Dec. 22, 2014.

(51) Int. Cl.
| | |
|---|---|
| C04B 28/14 | (2006.01) |
| C04B 111/00 | (2006.01) |
| B28B 1/52 | (2006.01) |
| B28B 19/00 | (2006.01) |
| C04B 18/24 | (2006.01) |
| C04B 24/04 | (2006.01) |
| C04B 40/00 | (2006.01) |
| C04B 103/10 | (2006.01) |
| C04B 103/20 | (2006.01) |

(52) U.S. Cl.
CPC .............. *C04B 28/147* (2013.01); *B28B 1/52* (2013.01); *B28B 19/0092* (2013.01); *C04B 18/241* (2013.01); *C04B 24/04* (2013.01); *C04B 28/146* (2013.01); *C04B 40/0039* (2013.01); *C04B 2103/10* (2013.01); *C04B 2103/20* (2013.01); *C04B 2111/0062* (2013.01)

(58) Field of Classification Search
None
See application file for complete search history.

(56) References Cited

U.S. PATENT DOCUMENTS

| | | | | |
|---|---|---|---|---|
| 5,154,874 A | * | 10/1992 | Koslowski | ............ C04B 28/147 |
| | | | | 264/102 |
| 5,531,946 A | * | 7/1996 | Bold | ....................... B28B 1/526 |
| | | | | 156/39 |
| 2015/0152010 A1 | * | 6/2015 | Aschern | ................ C04B 28/147 |
| | | | | 106/781 |

FOREIGN PATENT DOCUMENTS

DE  2257827  *  6/1974

* cited by examiner

*Primary Examiner* — Mary Lynn F Theisen
(74) *Attorney, Agent, or Firm* — Mark Terry

(57) ABSTRACT

A gypsum fiber board produced in a Siempelkamp dry-process, comprising 75 wt % to 90 wt % (relative to the total dry mix) of calcium sulfate hemi-hydrate and 10 wt % to 25 wt % (relative to the total dry mix) paper fibers, wherein the calcium sulfate hemi-hydrate is a mixture of α-calcium sulfate hemi-hydrate and β-calcium sulfate hemi-hydrate, wherein the content of α-calcium sulfate hemi-hydrate in the mixture is at least 5 wt % (relative to the total calcium sulfate hemi-hydrate) is disclosed. Also disclosed is a method for producing a gypsum fiber board of a thickness of 23 mm in a Siempelkamp dry-process.

5 Claims, 3 Drawing Sheets ent application is a continuation of and claims

GYPSUM FIBER BOARD AND METHOD FOR PRODUCING GYPSUM FIBER BOARDS

CROSS-REFERENCE TO RELATED APPLICATIONS

This patent application is a continuation of and claims priority to international application number PCT/EP2014/003457 filed Dec. 22, 2014 titled "Gypsum Fiber Board and Method for Producing Gypsum Fiber Boards". The subject matter of international application number PCT/EP2014/003457 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

In prior art, a method for producing gypsum fiber boards by the so-called Siempelkamp process is known for example from the publication DE. 2 257 827. According to this process, a dry mixture of fibers and the mineral binder calcium sulfate hemi-hydrate is spread uniformly onto a continuously moving conveyor belt. Hydration water is added by netting the dry mixture before passing it through a continuously working hydraulic press in order to form an endless board which subsequently may be cut into a plurality of separate pieces. The hydration water is added to the dry mixture before compression of the latter and is absorbed by means of vacuum applied to the fiber gypsum mixture whereby a large portion of the water which remains in the endless compressed board still reacts with the plaster. After the setting process is completed, the boards are dried and are supplied to further finishing stages, e.g., for grinding, further cutting, stacking, etc.

Today with the Siempelkamp process it is only possible to form gypsum fiber boards having a thickness of up to 19 mm at the maximum. Basically, the board thickness is dependent on the mass and the pouring height of the mixture of fibers and calcium sulfate hemi-hydrate applied onto the conveyor belt. However, at a certain mass and/or pouring height of the dry mixture of fibers and calcium sulfate hemi-hydrate, the latter may no longer wetted sufficiently by the hydration water which is added prior to compression, even if the amount of water is further increased. This means that sometimes dry material remains on the conveyor belt after pressing which is not incorporated into the plaster board to be produced.

In prior art, a solution for increasing the thickness of a board produced on a Siempelkamp production plant above the limit of 19 mm has not yet been found. As already mentioned above, neither the increase of water to be added nor any modifications to the machines used for the above described Siempelkamp production process have rendered a board thickness of more than 19 mm.

SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a gypsum fiber board produced in a Siempelkamp dry-process, comprising 75 wt % to 90 wt % (relative to the total dry mix) of calcium sulfate hemi-hydrate and 10 wt % to 25 wt % (relative to the total dry mix) paper fibers, wherein the calcium sulfate hemi-hydrate is a mixture of α-calcium sulfate hemi-hydrate and β-calcium sulfate hemi-hydrate, wherein the content of α-calcium sulfate hemi-hydrate in the mixture is at least 5 wt % (relative to the total calcium sulfate hemi-hydrate) is disclosed. Also disclosed is a method for producing a gypsum fiber board of a thickness of 23 mm in a Siempelkamp dry-process.

DETAILED DESCRIPTION

Figure 1:
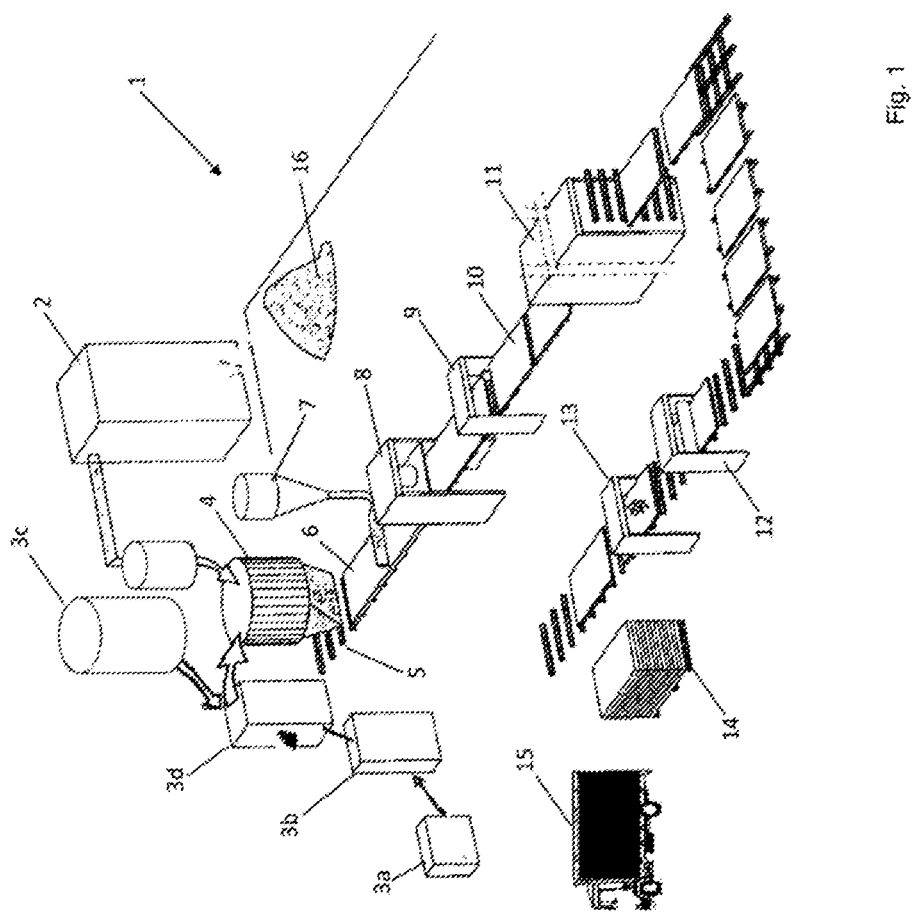
FIG. 1 shows a schematic view of a Siempelkamp production plant according to prior art.

The invention pertains to a gypsum fiber board and a method for producing gypsum fiber boards. It is an object of the present invention to improve methods for producing a gypsum fiber board and to provide a gypsum fiber board produced in such a process and in particular to a Siempelkamp production process which allows for producing gypsum fiber boards of more than 19 mm.

This object is solved by a gypsum fiber board and a method for producing a gypsum fiber boards having the features of the respective independent claim. Preferred embodiments of the invention are defined by the respective dependent claims.

According to the invention, a gypsum fiber board produced in a Siempelkamp process is provided comprising 75 wt % to 90 wt % (relative to the total dry mix) of calcium sulfate hemi-hydrate and 10 wt % to 25 wt % (relative to the total dry mix) of paper fibers, wherein the calcium sulfate hemi-hydrate is a mixture of α-calcium sulfate hemi-hydrate and β-calcium sulfate hemi-hydrate, wherein the content of α-calcium sulfate hemi-hydrate in the mixture is at least 5 wt % (relative to the total calcium sulfate hemi-hydrate). By the specific selection of the proportion of α-calcium sulfate hemi-hydrate, β-calcium sulfate hemi-hydrate, and/or the fibers, the wettability which is to be understood to be the ability of the water to protrude the mixture of α-calcium sulfate hemi-hydrate and β-calcium sulfate hemi-hydrate may be increased. Specifically, by adding α-calcium sulfate hemi-hydrate in a proportion of at least 5 wt % (relative to the total calcium sulfate hemi-hydrate), the wettability is increased such that the gypsum fiber board may be produced in a Siempelkamp process (of the identical applied vacuum pressure) with a thickness of up to 23 mm (i.e. a thickness of 25 mm before grinding).

According to a preferred embodiment of the invention, the content of α-calcium sulfate hemi-hydrate is at least 20 wt % (relative to the total calcium sulfate hemi-hydrate), in particular, about 30 wt % (relative to the total calcium sulfate hemi-hydrate). With the content of β-calcium sulfate hemi-hydrate being preferably at least 50 wt % (relative to the total calcium sulfate hemi-hydrate), and in particular, about 60 wt % (relative to the total calcium sulfate hemi-hydrate), fiber boards may be produced having a thickness of more than 19 mm, specifically of 23 mm.

According to a further preferred embodiment, the mixture of dry material further comprises retardant, in particular, citric acid.

According to a still further preferred embodiment, the mixture of dry material further comprises an accelerator; in particular, dehydrate which might originate from sawing or grinding. By means of specific additives, as for example, retardants or accelerators, the plaster may be modified so as to fulfill specific requirements of the intended application areas.

Preferably, the board has a thickness greater than 19 mm, in particular, of about 23 mm. This increased thickness renders a higher strength and stability to the board which in various implementations may be advantageous.

The wettability of the gypsum fiber mixture and, thus, the thickness of the gypsum fiber board may be further increased by adaptation of the granulation. Specifically, it is advantageous, if gypsum fiber composition has no granulation below 1 µm which means that the share of granulation size below 1 µm is less than 10%.

Moreover, the wettability may be further improved by the appropriate selection of the fibers which are present in the dry mixture. Preferably, there should be no fibers present in the having a length of less than 1 µm. It is specifically advantageous, if the fibers have a short and thin morphology rather than being long and thick. It is also preferred, if the content of fibers having a length greater than 90 µm is less than 65 wt %.

Further, wetting agents may be present in the gypsum fiber composition which influences the surface tension of the hydration water in order to even further increase the wettability.

Preferably, the finished board having a thickness of 23 mm has a bulk density of 1000 to 1500 kg/m$^3$, in particular 1220 to 1390 kg/m$^3$, and a weight per unit area of 23 to 35 kg/m$^2$, in particular 28 to 32 kg/m$^2$. Thus, a gypsum fiber board having an improved strength and stability compared to an 18 mm gypsum fiber board may be provided. According to the present invention, a method for producing gypsum fiber boards is also provided comprising the steps of preparing a compressible mat of gypsum-containing material from a mixture comprising 75 wt % to 90 wt % (relative to the total dry mix) of calcium sulfate and 10 wt % to 25 wt % (relative to the total dry mix) of paper fibers, wherein the calcium sulfate hemi-hydrate is a mixture of α-calcium sulfate hemi-hydrate and β-calcium sulfate hemi-hydrate, wherein the content of α-calcium sulfate hemi-hydrate in the mixture is at least 5 wt % (relative to the total calcium sulfate hemi-hydrate); moving the dry compressible mat of gypsum-containing material on a conveyor belt to a hydration water tank; and hydrating the gypsum-containing material with hydration water added from above to the surface of the mat in excess prior to passing the gypsum-containing material through a continuous press to form an endless gypsum fiber board having a thickness greater than 19 mm. By using the specific composition, it is possible to produce a gypsum fiber board with an increased thickness in a Siempelkamp process, specifically, in a Siempelkamp production plant.

Preferably, the step of preparing the compressible mat comprises mixing at least 20 wt % (relative to the total calcium sulfate hemi-hydrate) α-calcium sulfate hemi-hydrate, in particular, about 30 wt % (relative to the total calcium sulfate hemi-hydrate) with at least 50 wt % (relative to the total calcium sulfate hemi-hydrate), in particular, about 60 wt % (relative to the total calcium sulfate hemi-hydrate) of β-calcium sulfate hemi-hydrate. As mentioned above, this composition allows for the production of gypsum fiber boards having a thickness of more than 19 mm.

The method may further comprise a step of adding a retardant, in particular, citric acid, and/or a step of adding an accelerator, in particular, dehydrate as accelerator, in order to adjust the properties of the finished board to the intended application fields.

It is also preferably to adjust the granulation of the gypsum fiber composition so as to be above 1 µm, in order to further enhance the wettability and thus, enable production of gypsum fiber boards having a thickness of greater than 19 mm.

According to still a further embodiment of the method, the thickness of the dry compressible mat of gypsum-containing material prior to adding water is within the range of 80 mm to 100 mm, in particular 85 mm to 95 mm.

FIG. 1 is a schematic view of a Siempelkamp production plant 1 according to prior art for producing gypsum fiber boards in a dry Siempelkamp process. The production plant 1 comprises a paper processing device 2 for processing waste paper 16. Further, the production plant 1 comprises a sequence of processing stations 3a to 3d for preparing the calcium sulfate hemi-hydrate with 3a indicating a station comprising a recycling device, 3b indicating a station for processing (e.g., milling) the recycled material, 3c indicating a gypsum reservoir for storing gypsum to be added from the reservoir 3c to a calcination device 3d in which the mixture of recycled and processed material is subjected to a calcination procedure together with the gypsum added from the reservoir 3c in order to dehydrate the material. The accordingly processed paper fibers from the paper processing device 2 and the calcinated material from the calcination device 3d are supplied to a mixing and spreading device 4 which then spreads the mixed gypsum fiber composition uniformly onto a continuously moving conveyor belt 5. According to processes known from prior art, the weight per unit area of the gypsum fiber composition lies within the range of 25 to 28.5 kg/m2 (for the dry material mixture) from which a gypsum fiber board having a thickness of 18 mm will result. The spread gypsum fiber composition now forms a mat 6 on the conveyor belt 5 having a height in the range of 75 to 87 mm. Then, as the mat 6 is carried further on the conveyor belt 5, prior to being passed through a continuous hydraulic press 8, it is hydrated by supplying hydration water from a tank 7 from above onto the top surface 9 of the mat 6 whereby the water is applied in excess. Then the mat 6 travels through the hydraulic press 8 such that the gypsum fiber composition is compressed to a board having a bulk thickness of about 25 mm with a density in the range of 1220 to 1390 kg/m3. After leaving the hydraulic press 8 as an endless board, the latter is being grinded to a thickness of 23 mm and cut to single pieces having a predetermined length by means of a sawing device 9. The cut pieces or boards 10 are then supplied to a drying furnace 11 followed by a grinding device 12 and a primer device 13. The finished gypsum fiber boards 10 are then stacked on pallets 14 on which they may be loaded into a vehicle 15. The velocity of the conveyor belt 5 for a board 10 thus produced is 120 mm/s. As already mentioned above, the gypsum fiber boards 10 produced according to prior art have a maximum thickness of 19 mm.

According to the present invention, the wettability can be improved, and thus, the thickness of the gypsum fiber board 10 to be produced may be increased above 19 mm by specific selection of the gypsum and/or the fibers. Wettability, as already mentioned above, is the ability of the material to let the water protrude the mixture of α-calcium sulfate hemi-hydrate and β-calcium sulfate hemi-hydrate. Depending on which liquid is used, and on the material of the corresponding surface of solid material as well as its structure, e.g., with respect to its roughness, a liquid may wet the surface more or less. Thus, in order to obtain a gypsum fiber board 10 according to an embodiment of the present invention having a thickness of more than 19 mm, the initial gypsum fiber composition comprises 10 to 25 wt % relative to the total dry mix of paper fibers from waste paper, 75 to 90 wt % relative to the total dry mix. The calcium sulfate hemi-hydrate is a mixture of α-calcium sulfate hemi-hydrate and β-calcium sulfate hemi-hydrate. Specifically, the content of α-calcium sulfate hemi-hydrate in the mixture is at least 5 wt % (relative to the calcium sulfate hemi-hydrate). Further, the gypsum fiber composition comprises citric acid as retardant and dihydrate (grinding dust or sawing dust) as accelerator (i.e. 0.5% to 5%).

According to a preferred embodiment of the invention, 30 wt % of α-calcium sulfate hemi-hydrate and 60 wt % of β-calcium sulfate hemi-hydrate are mixed in the initial composition. Further, the granulation should not contain grain sizes below 1 μm. Moreover, a further improvement of the wettability is achieved, if the fiber particles are larger than 1 μm. Specifically, short and thick or long and thin fibers improve the results with respect to wettability. Also, fibers larger than 90 μm should only be present in a proportion of 65% or less. To obtain the optimal fiber configuration in the gypsum fiber composition, the fibers are filtered prior-to being added to the mixing and spreading device 4.

A further positive effect as to wettability and, thus, thickness of the gypsum fiber board, may be achieved by the specific selection of the type of waste paper. For example, newspapers have a low content of fine particles, journals, magazines and catalogues have a higher content of fine particles. To achieve the best results, waste paper having a low content of fine particles should be selected.

A further improvement can be yet achieved when adding a wetting agent to influence the surface tension of the hydration water added to the dry gypsum fiber composition from the tank 7. The gypsum fiber composition according to an embodiment of the invention as outlined above may then be processed in the plant 1 as outlined above. However, the height of the mat 6 prior to adding hydration water from the tank 7 lies within a range 80 mm to 100 mm, in particular 85 mm to 95 mm, when producing a gypsum fiber board 10 having a thickness of 23 mm (which is 25 mm before grinding). Further, the weight per unit area for such a gypsum fiber composition 10 lies within the range of 28 to 32 kg/m$^2$ whereas the bulk density of the finished gypsum fiber boards 10 according to the embodiment lies within the range of 1000 to 1500 kg/m$^3$.

Figure 2:
FIG. 2 shows water evacuation curves according to various mixing ratios of α-calcium sulfate hemi-hydrate and β-calcium sulfate hemi-hydrate.

FIG. 2 shows water evacuation curves according to various mixing ratios of α-calcium sulfate hemi-hydrate and β-calcium sulfate hemi-hydrate to prove the effect of that an increased portion of α-calcium sulfate hemi-hydrate has a positive effect to the wetting, in particular, to the evacuation. The curves have been taken by means of the following experimental set-up. A vacuum pump has been arranged at a glass container provided with a funnel and a sieve (and paper filter) at its upper open end. The composition, i.e., various mixtures containing α-calcium sulfate hemi-hydrate and β-calcium sulfate hemi-hydrate in different ratios, is introduced into the funnel. The pump creates a uniform vacuum (i.e. 0.5 bar) and water is sucked from the composition whereby the time is measured. The weight of the water sucked from the composition is measured in the glass container.

The diagram of the water evacuation over time, the amount of water sucked through the material over time, curve 1 shows a ratio of α-calcium sulfate hemi-hydrate to β-calcium sulfate hemi-hydrate of 60:40 (60% α-calcium sulfate hemi-hydrate/40% β-calcium sulfate hemi-hydrate), curve 2 shows a ratio of α-calcium sulfate hemi-hydrate to β-calcium sulfate hemi-hydrate of 40:60 (40% α-calcium sulfate hemi-hydrate/60 β-calcium sulfate hemi-hydrate), curves 3 respectively show a ratio of α-calcium sulfate hemi-hydrate to β-calcium sulfate hemi-hydrate of 20:80 (20% α-calcium sulfate hemi-hydrate/80% β-calcium sulfate hemi-hydrate), curve 4 respectively shows a curve for 100% β-calcium sulfate hemi-hydrate.

As can be seen from the diagram shown in FIG. 2, α-calcium sulfate hemi-hydrate seems to have better properties concerning the wetting as more water can be sucked out of the compositions containing more α-calcium sulfate hemi-hydrate. α-calcium sulfate hemi-hydrate has the better properties concerning the absorption of water as more water can be sucked out of the compositions containing more α-calcium sulfate hemi-hydrate. This is caused by the crystal properties of the α-calcium sulfate hemi-hydrate, in particular of the compact geometry thereof.

Figure 3:
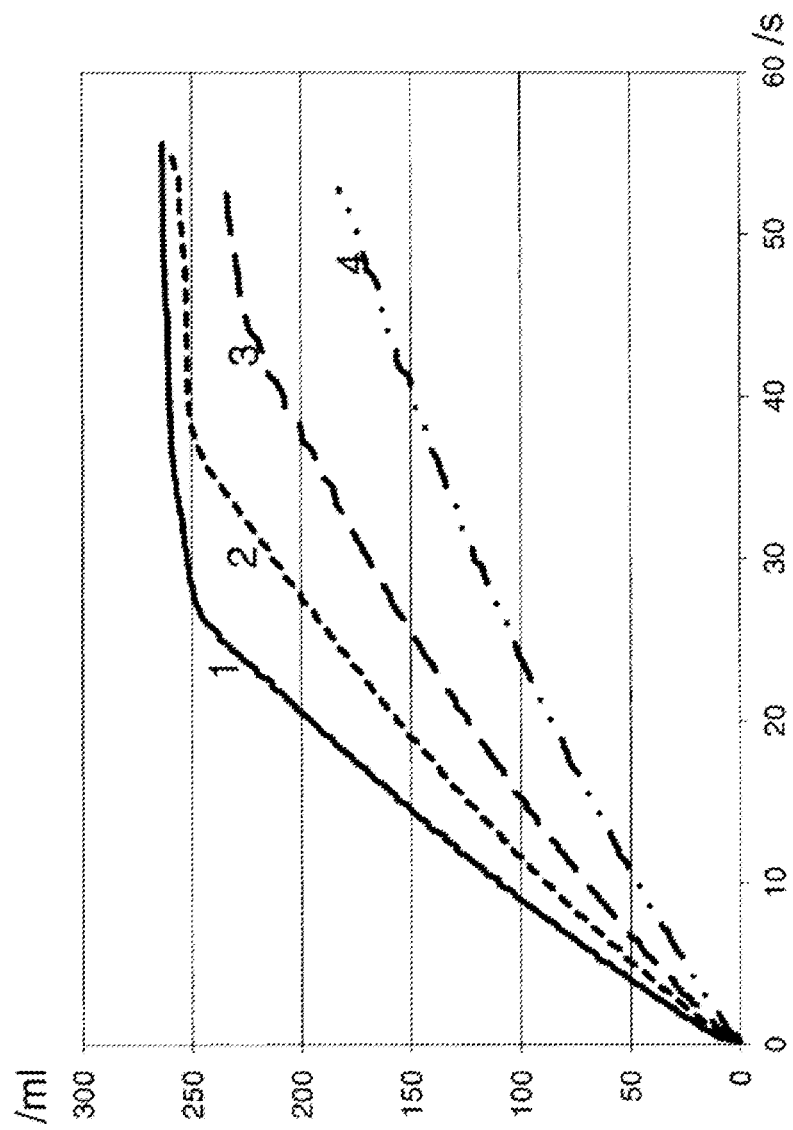
FIG. 3 shows water evacuation curves according to various granulations of α-calcium sulfate hemi-hydrate and β-calcium sulfate hemi-hydrate.

FIG. 3 shows water evacuation curves according to various granulations of α-calcium sulfate hemi-hydrate. The same experimental set-up has been used as explained above in connection with FIG. 2. Curves 1 and 2 respectively show water evacuation curves for α-calcium sulfate hemi-hydrate with different granulation wherein curve 1 is the coarser granulation compared to the α-calcium sulfate hemi-hydrate represented in curve 2. Curves 3 and 4 show water evacuation characteristics of different β-calcium sulfate hemi-hydrate materials originating from different plants.

What is claimed is:

1. A method for producing gypsum fiber boards, comprising the steps of:
    preparing a compressible mat of gypsum-containing material from a mixture comprising 75 wt % to 90 wt %, relative to the total dry mix, of calcium sulfate hemi-hydrate and 10 wt % to 25 wt %, relative to the total dry mix, of paper fibers, wherein the calcium sulfate hemi-hydrate is a mixture of α-calcium sulfate hemi-hydrate and β-calcium sulfate hemi-hydrate, wherein the content of α-calcium sulfate hemi-hydrate in the mixture is at least 10 wt %, relative to the total calcium sulfate hemi-hydrate;
    moving the dry compressible mat of gypsum-containing material on a conveyor belt to a hydration water tank, and
    hydrating the gypsum-containing material with hydration water added from above to the top surface of the mat in excess prior to passing the gypsum-containing material through a continuous press to form an endless gypsum fiber board having a thickness greater than 19 mm.

2. The method according to claim 1, wherein the step of preparing the compressible mat comprises mixing at least 20 wt %, relative to the total calcium sulfate hemi-hydrate, of α-calcium sulfate hemi-hydrate, with a least 50 wt %, relative to the total calcium sulfate hemi-hydrate, of β-calcium sulfate hemi-hydrate.

3. The method according to claim 1, further comprising a step of adding a citric acid retardant, and/or a step of adding a coated dihydrate accelerator.

4. The method according to claim 1, wherein the granulation of at least 90% of the gypsum fiber composition is above 1 µm.

5. The method according to claim 1, wherein the thickness of the dry compressible mat of gypsum-containing material prior to adding water is within the range of 80 mm to 100 mm.

* * * * *